July 21, 1931.  F. W. ALEXANDER  1,815,879
FABRIC BELTING
Filed Feb. 16, 1927
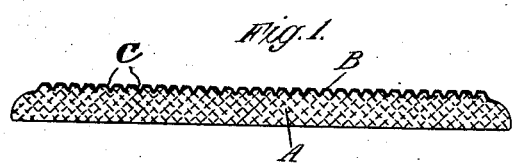
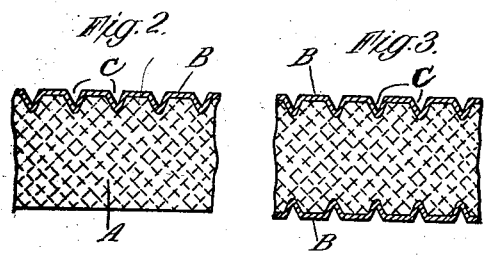
Inventor
Frederick W. Alexander
By
Attorney Patented July 21, 1931

1,815,879

UNITED STATES PATENT OFFICE

FREDERICK WILFRID ALEXANDER, OF CARDIFF, WALES, ASSIGNOR OF A HALF SHARE TO LEWIS & TYLOR LIMITED, OF CARDIFF, WALES

FABRIC BELTING

Application filed February 16, 1927, Serial No. 168,711, and in Great Britain March 25, 1926.

The invention relates to the construction of fabric belting, either of the driving or conveying types.

It has been previously proposed to form fabric belting with slight flutings, corrugations or ridges in order to allow a free escape of the air which forms a cushion between the under side of the belt and the driving pulley and lessens the grip between these surfaces.

Belting is also known in which the fabric is provided with an outer covering of rubber, but such covering has usually been applied only in the form of a thin plain sheet.

It has been proposed to cover the fabric of driving belts with a thickness of rubber or rubber compounds which is pressed on to the surface of the fabric to provide flutings, corrugations or the like in order to increase the adherence between the belt and the contact surfaces and reduce the slip.

According to the present invention, the covering of rubber or rubber compound which is of relatively large and uniform thickness is, for the purpose of obtaining a more secure connection between the covering and the fabric, provided on the surfaces next to the fabric with projections or corrugations impressed into the surface of the fabric and forming on the exterior surfaces corresponding flutings or grooves. When such belting is used as a conveyer for hot ashes or other substance at a high temperature there is a sufficient layer of heat insulating material to prevent any damage to the fabric.

It has also been proposed to cover a fabric belting with a thin fluted sheet of balata, but as this material will only stand a temperature of about 95° F. it cannot be used for many purposes for which rubber or rubber compounds, which can be raised to about 270° F. without change, is perfectly adapted.

In the accompanying drawings which represent an example of a belt according to the invention—

Fig. 1 is a cross section and

Figs. 2 and 3 part sections on a larger scale showing respectively a fluted rubber covering on one or both sides of a belt.

A is the fabric, B the rubber covering, C the inner projections impressed into the material of the fabric and leaving on the outer surface corresponding flutings or grooves.

The flutings may be either in the longitudinal or transverse direction of the belt, or in both directions, or the rubber covering may be provided with raised projections distributed in any suitable manner.

The invention may be applied either to belting built up in ply form or to the solid woven type.

Having thus described the nature of my said invention and the best means I know of carrying the same into practical effect, I claim:—

A belt of plain fabric provided on one face with a covering of rubber of relatively large and uniform thickness, which is provided on the surface next to the fabric with projections impressed into the surface of the fabric and forming on the external surface corresponding recesses.

In testimony whereof I have signed my name to this specification.

F. W. ALEXANDER.